US 7,744,794 B2
Jun. 29, 2010

(12) United States Patent
Globus et al.

(54) EXTRUSION PROCESS

(75) Inventors: Yevgeniy I. Globus, Littleton, MA (US); Mark A. Jozokos, Pelham, NH (US); John L. Netta, Newark, DE (US); George Martin Pruce, Glastonbury, CT (US); Sundar Kilnagar Venkataraman, Vienna, WV (US)

(73) Assignees: E. I. du Pont de Nemours and Company, Wilmington, DE (US); AlphaGary Corporation, Leominster, MA (US)

( * ) Notice: Subject to any disclaimer, the term of this patent is extended or adjusted under 35 U.S.C. 154(b) by 1214 days.

(21) Appl. No.: 11/039,440

(22) Filed: Jan. 19, 2005

(65) Prior Publication Data

US 2005/0179164 A1    Aug. 18, 2005

Related U.S. Application Data

(60) Provisional application No. 60/539,037, filed on Jan. 23, 2004.

(51) Int. Cl.
*D01F 1/02* (2006.01)
(52) U.S. Cl. ..................................... 264/211
(58) Field of Classification Search .................. 264/211
See application file for complete search history.

(56) References Cited

U.S. PATENT DOCUMENTS 4,427,877 A * 1/1984 Dhingra ...................... 219/548
4,686,144 A   8/1987 Hupfer et al.
4,749,752 A   6/1988 Youlu et al.
4,960,624 A   10/1990 Ueno
5,000,875 A   3/1991 Kolouch
5,320,789 A   6/1994 Nishii et al.
5,677,404 A   10/1997 Blair
5,888,424 A   3/1999 Ebnesajjad et al.
6,797,760 B1 * 9/2004 Ebrahimian et al. ......... 524/445
7,244,786 B2 * 7/2007 Matsumoto et al. ......... 525/107
2004/0232580 A1 * 11/2004 Defeo et al. ................ 264/40.6
2004/0260023 A1 * 12/2004 Park et al. ................... 525/131
2005/0155690 A1 * 7/2005 Park .............................. 156/60
2005/0281973 A1 * 12/2005 Park ......................... 428/36.92

FOREIGN PATENT DOCUMENTS

| EP | 0 076 130 | 4/1983 |
| EP | 0 857 756 A1 | 8/1998 |
| JP | 62285939 | 12/1987 |
| JP | 03281557 | 12/1991 |
| JP | 04063849 | 2/1992 |
| JP | 07216278 | 8/1995 |
| WO | WO 01/80253 A1 | 10/2001 |

OTHER PUBLICATIONS

Dupont (R) CJ-95 Product Bulletin, Jan. 2002.*

* cited by examiner

*Primary Examiner*—Kat Wyrozebski
*Assistant Examiner*—Robert J Grun

(57) ABSTRACT

The present invention relates to the extrusion of a composition comprising tetrafluoroethylene/hexafluoropropylene copolymer, 10-60 wt % inorganic particulate filler, and hydrocarbon polymer for dispersing the filler in the copolymer, preferably 0.1 to 5 wt % hydrocarbon polymer, at low temperatures, e.g. up to 650° F. (343° C.).

11 Claims, No Drawings

EXTRUSION PROCESS

BACKGROUND OF THE INVENTION

1. Field of the Invention

This invention relates to a process for extruding tetrafluoroethylene/hexafluoropropylene copolymer.

2. Description of Related Art

U.S. Pat. No. 5,000,875 discloses the blending of thermally conductive fillers with fluorinated fluoropolymers to provide composites that exhibit surprisingly high thermal conductivity. The fluorination of the fluoropolymer involves exposing the fluoropolymer to fluorinating agent to convert unstable end groups to stable end groups. Unfortunately the addition of filler to the copolymer causes the viscosity of the resultant composition when melted to increase, resulting in a reduced production rate by typical melt fabrication processing such as extrusion, including injection molding. Tetrafluoroethylene (TFE)/hexafluoropropylene (HFP) copolymer is extruded at temperatures of at least 680° F. (360° C.), which is at least about 100° C. greater than the 260° C. melting temperature of the copolymer, and more typically at temperatures of at least 698° F. (370° C.). The increase in melt viscosity resulting from filler addition may be offset somewhat by increasing the melt temperature of the composition in the extrusion process. This, however, has the disadvantage of exposing the copolymer to degradation, causing discoloration and reduced physical properties of the extruded article.

BRIEF SUMMARY OF THE INVENTION

The present invention has found that large amounts of inorganic particulate filler can be added to tetrafluoroethylene/hexafluoropropylene copolymer to form a composition that can be extruded at relatively low temperatures without loss in production rate. It has also been found that not only can the extrusion be carried out at relatively low temperature, but that notwithstanding the use of this low temperature and the presence of the filler in the composition, the production (extrusion) rate can be increased, as will be described later herein.

One embodiment of the present invention is a process comprising extruding a composition comprising tetrafluoroethylene/-hexafluoropropylene (FEP) copolymer, about 10 to 60 wt % inorganic particulate filler, and an effective amount of hydrocarbon polymer to disperse said particulate filler in said copolymer either during melt blending prior to said extruding of said composition or during said extruding, the amount of said copolymer, filler and polymer totaling 100 wt %. Unexpectedly, said extruding can be carried out at low temperatures, e.g. from 520° F. (271° C.) to 650° F. (343° C.), preferably at a temperature of 560° F. (293° C.) to 620° F. (326° C.) and more preferably at a temperature of 580° F. (304° C.) to 600° F. (315° C.). These low extrusion melt temperatures are unprecedented and provide additional safety against degradation of the FEP and reduced corrosive effect of the molten FEP on the extrusion equipment. The expense of fluorination of the FEP to convert unstable end groups to stable end groups is not necessary to obtain this advantageous extrusion result.

Another embodiment of the present invention is the composition providing this unexpected extrudability.

DETAILED DESCRIPTION OF THE INVENTION

In the FEP used in the present invention, the HFP content will typically be about 9-17 wt %, the remainder being TFE. Preferably, the FEP contains an additional monomer such as perfluoro(alkyl vinyl ether) (PAVE), wherein the alkyl group contains 1 to 4 carbon atoms, such as perfluoro(ethyl vinyl ether) (PEVE) or perfluoro(propyl vinyl ether) (PPVE). The preferred FEP is TFE/HFP/PAVE copolymer, most preferably TFE/HFP/PPVE and TFE/HFP/PEVE copolymer, wherein the HFP content is 9-17 wt % and the PAVE content is about 0.2 to 3 wt %, the remainder being TFE, to total 100 wt % for the copolymer. The reference to monomer content of the copolymer refers to units derived from the monomer by polymerization.

The melt flow rate (MFR) of the FEP used in the present invention is relatively high, preferably at least about 10 g/10 min, more preferably at least about 15 g/10 min, and even more preferably at least about 20 g/10 min and most preferably at least about 26 g/10 min, as measured according to ASTM D 2116-91a.

The composition of the present invention is highly filled, the inorganic particulate filler constituting at least about 10 wt % of the composition (FEP, filler, and hydrocarbon polymer). The amount of filler desired will depend on its intended purpose. For example, the filler can be a char-forming agent that forms a char when the article molded from the composition is subjected to burning. A preferred utility of the composition used in the present invention is as a cable jacket for plenum cable, which is cable used for data and voice transmission that is installed in building plenums, i.e. the spaces above dropped ceilings or below raised floors that are used to return air to conditioning equipment. The cable comprises a core which performs the transmission function and a jacket over the core. Typical core constructions include a plurality of twisted pairs of insulated wires or coaxially-positioned insulated conductors. The char-forming agent is present in the composition forming the jacket in a sufficient amount to enable the cable to pass the NFPA-255 burn test (Surface Burning of Building Materials), i.e. to exhibit a smoke developed index (Smoke Index) of no greater than 50 and a flame spread index (Flame Spread Index) of no greater than 25 in accordance with Appendix A of UL-2424. In the burn test, the agent does not prevent the perfluoropolymer from burning, because the fluoropolymer is not flammable in this burn test, i.e. it has a Flame Spread Index of no greater than 25. Instead, the agent contributes to formation of a char structure that prevents the total composition from dripping, which would lead to objectionable smoke formation (Smoke Index exceeding 50) and failure of the burn test. The amount of char-forming agent necessary for the jacket to pass this test will depend on the effectiveness of the particular agent used. Some agents are more effective than others, whereby a relatively small amount of agent will suffice. The filler, whether it be a char-forming agent or just contributes to the surprising extrudability of the composition of the present invention or both, can be a single filler or a mixture thereof. Examples of fillers including char-forming agents are zinc molybdate, calcium molybdate, metal oxides such as $ZnO$, $Al_2O_3$, $TiO_2$ and $MgZnO_2$. Preferably, the amount of filler in the composition will be about 20 to 50 wt % (FEP, filler, hydrocarbon polymer). Preferably the mean particle size of the char-forming agent is no greater than about 3 μm, and more preferably, no greater than about 1 μm, to provide the best physical properties for the composition. Another example of filler, which is also a char-forming agent, is ceramic microspheres, such as Zeeospheres® ceramic microspheres available from the 3M Company, which are understood to be alkali alumina silicates, which may have a larger mean particle size than about 3 μm. e.g. as large as about 5 μm, with smaller particle sizes, such as no greater than about 3 μm mean particle size being preferred.

Preferably, the mean minimum particle size is at least about 0.05 μm; smaller particle sizes tend to embrittle the composition. In one embodiment of the present invention, the filler comprises a plurality of fillers, e.g. a plurality of char-forming agents. In another embodiment of the present invention, at least one of this plurality of fillers is ceramic microspheres. A preferred composition comprises about 5 to 20 wt % ceramic microspheres and about 20-40 wt % of another filler, preferably a char-forming agent, more preferably ZnO, to constitute the about 10-60 wt % filler component of the composition to be extruded in accordance with the present invention.

The filler, such as char-forming agent, is also thermally stable and non-reactive at the melt processing temperature of the composition, in the sense that it does not cause discoloration or foaming of the composition, which would indicate the presence of degradation or reaction. The filler may itself have color, typically white, which provides the color of the melt processed composition. In the burn test however, the formation of char when the filler is char-forming agent, indicates the presence of degradation.

The hydrocarbon polymer in the composition is used in an amount that is effective to provide the physical properties, such as tensile strength and elongation, desired. The hydrocarbon polymer itself does not provide the improved physical properties. Instead, the hydrocarbon polymer interacts with the filler and FEP to limit the reduction in tensile properties that the filler, if used by itself, would cause in the FEP composition. Without the presence of the hydrocarbon polymer, the melt blend of the FEP/filler tends to be cheesy in appearance, i.e. to lack integrity, e.g. showing cracks and containing loose, unincorporated filler. With the hydrocarbon polymer being present, a uniform-appearing melt blend is obtained, in which the entire filler is incorporated into the melt blend. Thus, the hydrocarbon polymer acts as a dispersing agent for the char-forming agent, which is surprising in view of the incompatibility of the FEP and hydrocarbon polymer. Hydrocarbon polymer does not adhere to FEP. Neither does the filler. Nevertheless and surprisingly, the hydrocarbon polymer acts as a dispersing agent for the filler. The effectiveness of the dispersion by the hydrocarbon polymer can be characterized by the tensile test specimen of the composition of the present invention exhibiting an elongation of at least about 100%, preferably at least about 150%. The specimen also preferably exhibits a tensile strength of at least 1500 psi (10.3 MPa). Preferably these properties are achieved on cable jacket specimens in accordance with ASTM D 3032 under the operating conditions of the tensile testing jaws being 2 in (5.1 cm) apart and moving apart at the rate of 20 in/min (51 cm/min).

The amount of hydrocarbon polymer necessary to provide beneficial effect in the composition will generally be about 0.1 to 5 wt % (FEP, filler, and hydrocarbon polymer), depending on the amount of filler that is present in the composition. Preferably the amount of such polymer present is about 0.5 to 3 wt %, based on the total weight of the three components as specified above.

A wide variety of hydrocarbon polymers that are thermally stable at the melt temperature of the FEP provide this benefit to the composition. The thermal stability of the hydrocarbon polymer is visualized from the appearance of the melt blend of the composition, that it is not discolored or foamed by degraded hydrocarbon polymer. Since FEP melts at temperatures of at least about 250° C., the hydrocarbon polymer should be thermally stable at least up to this temperature and up to the higher melt processing temperature being used and the residence time in the melt processing equipment. Such thermally stable polymers can be semicrystalline or amorphous, and can contain aromatic groups either in the polymer chain or as pendant groups. Examples of such polymers include polyolefins such as the linear and branched polyethylenes, including high density polyethylene and Engage® polyolefin thermoplastic elastomer and polypropylene. Additional polymers include siloxane/polyetherimide block copolymer. Examples of aromatic hydrocarbon polymers include polystyrene, polycarbonate, polyethersulfone, and polyphenylene oxide, wherein the aromatic moiety is in the polymer chain. The preferred polymer is the thermoplastic elastomer, which is a block copolymer of olefin units and units containing an aromatic group, commonly available as Kraton® thermoplastic elastomer. Most preferred are the Kraton® G1651 and G1652 that are styrene/ethylene/butylene/styrene block copolymers containing at least 25 wt % styrene-derived units. The hydrocarbon polymer should have a melting temperature or be melt flowable in the case of amorphous hydrocarbon polymers so as to be melt-blendable with the other ingredients of the composition.

Thus, the composition of the present invention can be described as comprising FEP, about 10 to 60 wt % filler, and about 0.1 to 5 wt % hydrocarbon polymer, based on the total weight of these components. The composition can be in the pre-melt blend form (the physical blend of components) or can be melt blended such as to form pellets, each containing the three components, or can be in the form of the article molded from the melt blend.

The composition used in the present invention will typically start as a physical mixture of the components, which is then melt blended to disperse the filler in the perfluoropolymer. This melt blending can be part of the melt-fabrication process to produce the final article, e.g. using an extruder that also accomplishes the melt blending prior to the extrusion. Alternatively, the composition can be exposed to two melt blending processes, the first forming molding pellets, each containing all the components of the composition, and the second being the melt fabrication, such as by extrusion, to produce the desired final article. Typically, the two-melt blending process approach will be followed because of the flexibility it provides in choice of extrusion equipment for the extrusion practitioner. According to this typical approach, the composition is preferably compounded, such as by using a twin-screw extruder or Buss Kneader® compounding machine, to form molding pellets, each containing all three ingredients of the composition. The molding pellets are a convenient form for feeding to melt processing equipment such as for extruding the composition into the fabricated article desired, such as jacket for (on) twisted-pair cable. The Buss Kneader® operates by melting the polymer components of the composition and shearing the molten composition to obtain the incorporation of the filler into the perfluoropolymer with the aid of the hydrocarbon polymer. The residence time of the composition in this type of melt processing equipment may be longer than the residence time in extrusion equipment. To avoid degradation, the Buss Kneader® is operated at the lowest temperature possible consistent with good blending, barely above the melting temperature of the FEP, while the extrusion temperature can be higher, because of the shorter residence time in the processing equipment.

The composition of the present invention is especially useful for making the jacket of plenum cable containing a core of a plurality of twisted pair (insulated wires) or coaxially-positioned insulated conductors, wherein such cable passes the NFPA-255 burn test. The most common such cable will contain four twisted pairs of insulated wires, but the jacket can also be applied to form cable of many more twisted pairs of insulated wires, e.g. 25 twisted pairs, and even cable containing more than 100 twisted pairs. It is preferred that the wire insulation of the twisted pairs be also made of perfluoropolymer such as FEP. It has been found that when the entire insulation is replaced by polyolefin, the jacketed cable fails the NFPA-255 burn test. Other additives, such as pigment, can also be compounded into the composition.

Jacket made of FEP that passes the NFPA burn test has a low melt flow rate, such as about 2-7 g/10 min, which for jacketing for twisted pairs of insulated wires or insulated co-axial conductors, is limited to a very low line speed in the extrusion/jacketing operation of about 100 ft/min (30.5 m/min). Compositions of the present invention, notwithstanding their high filler (char-forming agent) content can be extruded as cable jacket at line speeds of at least about 300 ft/min (91.5 m/min), preferably at about 400 ft/min (122 m/min). Line speed is the windup rate for the cable, which is also the speed of the assemblage of twisted pairs fed through the extruder crosshead to receive the jacket. The rate of extrusion of molten composition is less than the line speed, with the difference in speeds being made up by the draw down ratio (DDR) of the extruded tube of molten composition drawn down in a conical shape to contact the core or assemblage of insulated wires. Draw down ratio is the ratio of the annular cross section of the extrusion die opening to the annular cross section of the jacket.

The composition of the present invention, while capable of high speed extrusion cable jacketing at relatively and surprisingly low temperatures, also produces a smooth jacket, which maintains the positioning of the twisted pairs within the jacket, but does not adversely affect electrical properties such as the attenuation of the electrical signal by the cable. The uneven outline (outer surface) of the twisted pairs within the cable should be barely to not at all visible from the exterior of the cable, whereby the outside of the jacket has a smooth appearance not conforming to the topography of the core of twisted pairs of insulated wires. Sometimes this is referred to as a "loose fit" but the fit of the jacket over the twisted pairs is snug enough that the jacket does not slide over the surface of the core to form wrinkles on the twisted pairs. One limitation of the line speed of the process of the present invention is the requirement for loose fit just described. High line speeds are possible in the extrusion process for coating wires with insulation to form the individual wires of the twisted pairs of insulated wires useful in the cable core, such high speeds involving high DDR, e.g. 100:1, which in effect means that the line speed is about 100× the rate of extrusion. High DDR, however, when used to form jacketing, provides excessively tight jacketing that adversely affects the signal transmission of the cable. Thus, the jacketing of the present invention is extruded at a DDR of no greater than about 40:1, preferably no greater than about 30:1, and more preferably no greater than about 20:1, so as to prevent the jacket from conforming to the topography of the core of twisted pairs of insulated wires. Preferably the DDR is at least 10:1. Preferably the draw ratio balance (ratio of (i) the draw of the outside of the molten FEP cone drawn down onto the core of the cable to (ii) the draw of the inside of the cone) is less than 1.

Articles other than cable jacketing can be advantageously melt fabricated (extruded) from compositions of the present invention, these articles too passing the NFPA-255 burn test. Examples of such articles include tubing, especially conduit (raceways) for data and voice transmission cable, profiles (spacers) for twisted pair cables, and tape for bundling cable.

In another embodiment of the present invention, the composition to be extruded in accordance with the present invention further comprises an inorganic phosphor in an effective amount to color said composition when subjected to excitation radiation. The phosphor also similarly colors the article made from the composition so that the manufacturing source of the composition from which the article is made is detectable. U.S. Pat. No. 5,888,424 discloses the incorporation of inorganic phosphor into colorant-free fluoroplastics in very small amounts, up to 450 ppm. The phosphor typically comprises an inorganic salt or oxide plus an activator, the combination of which is sensitive to exposure to radiation in the 200-400 nm wavelength region causing fluorescence in the visible or infrared wavelength region. This fluorescence, constituting emitted radiation, gives a colored appearance to the composition or article made therefrom, which is characteristic of the phosphor. The phosphors disclosed in the '424 patent are useful in the present invention, except that a greater amount is required for the colored appearance to be seen. Thus, in accordance with this embodiment, the amount of phosphor is about 0.1 to 5 wt %, preferably about 0.5 to 2 wt %, based on the combined weight of perfluoropolymer, filler, hydrocarbon polymer and phosphor. By way of example, the composition of Example 13 is supplemented with 0.5 to 1 wt % of ZnS/Cu:Al phosphor by dry mixing of the phosphor with the other jacket ingredients prior to extrusion, and the resultant jacket when subjected to ultraviolet light of 365 nm wavelength, gives a green appearance to the jacket in the visible wavelength region. When the ultra-violet light source is turned off, the jacket returns to its original white appearance. It will be noted that the phosphor of Example 30 of the '424 patent includes ZnO, which is the inorganic char-forming agent (filler) in the aforesaid Example 13. When this particular filler is used, an activator such as the Zn of Example 30 of the '424 patent is all that need be added to the extrusion composition to obtain a similar phosphor effect, i.e. fluorescence to produce a green color. Thus, in another embodiment of the present invention, when the filler has the ability to become a phosphor when suitably activated, an effective amount of such activator is added to the composition to produce the phosphor effect.

EXAMPLES

In the Examples below, the three-components: FEP, hydrocarbon polymer, and inorganic char-forming compound are melt blended together by the following general procedure: The perfluoropolymer compositions are prepared using a 70 millimeter diameter Buss Kneader® continuous compounder and pelletizer. A Buss Kneader® is a single reciprocating screw extruder with mixing pins along the barrel wall and slotted screw elements. The extruder is heated to temperatures sufficient to melt the polymers when conveyed along the screw. All ingredients are gravimetrically fed into the Buss Kneader® through one of the multiple feed ports along the barrel. The Buss Kneader® melt mixes all the ingredients to form a homogeneous compound. The molten homogeneous compound is fed into a heated cross-head extruder and pelletized. The description of the compositions in terms of "parts" refers to parts by weight unless otherwise indicated.

The general procedure for forming a jacket of the melt blended composition involves extruding the blend as a jacket over a bundle of four twisted pairs of FEP-insulated wires to form jacketed cable, using the following extrusion conditions: The extruder has a 60 mm diameter barrel, 30:1 L/D, and is equipped with a metering type of screw having a compression ratio with the respect to the barrel of about 3:1 as between the feed section of the screw and the metering section, i.e. the free volume, that is the volume in the extruder barrel that is unoccupied by the screw, wherein the screw flights in the feed section are about 3× the volume within the screw flights within the metering section. For a screw of constant pitch, the compression ratio is the ratio of the flight depth in the feed section to the flight depth in the metering section (metering into the crosshead). The application of heat to the extruder barrel starts with 530° F. (277° C.) in the feed section, increasing to 560° F. (293° C.) in the transition section and then to 570° F. (298° C.) in the metering section. The extruder is fitted with a B&H 75 crosshead. The assemblage of four twisted pairs of FEP-insulated wires is fed though the cross-head and out the die tip of the crosshead. The temperature of the molten fluoropolymer at the die surrounding the die tip is 598° F. (314° C.). The outer diameter of the die tip is 0.483 in (12.3 mm) and the inner diameter of the die is 0.587 in (14.9 mm), with the annular space between the die tip and the I.D. of the die forming the annular space through which a molten tube of FEP is extruded and drawn down to coat the assemblage of twisted pairs of insulated wire. No vacuum is used to draw the extruded tube down onto the core of twisted pairs of insulated wires. The draw down ratio is 10:1, the thickness of the jacket being 10 mils (0.25 mm), and the draw ratio balance is 0.99. The line speed is 403 ft/min (123 m/min).

The fire test chamber (elongated furnace) and procedure set forth in NFPA-255 is used to expose 25 ft (7.6 m) lengths of cable to burning along 5 ft (1.5 m) of the 25 ft length (7.6 m) of the furnace, the furnace being operated according to the instructions set out in NFPA-255. The lengths of cable for testing are placed in side-by-side contact with one another so as to fill the test space above the burner of the furnace with a bed of single thickness cable, and the cable is supported by metal rods spanning the furnace and spaced one foot (30.5 cm) apart along the length of the furnace and the length of the cables. Additional support for the cables is provided by steel poultry netting (chicken wire), the poultry netting laying on the metal rods and the cable laying on the poultry netting, as set forth in Appendix B-7.2. A large number of cables, each 25 ft (7.6 m) long, are laid side-by-side on the poultry netting as described above. For the common 4-pair twisted cable, having a jacket thickness of about 10 mils (0.25 mm), more than 100 cables, each 25 ft (7.6 m) in length, are tested at one time.

The Flame Spread Index is determined in accordance with Chapter 3, Appendix A of NFPA-255.

The Smoke Index is determined using the smoke measurement system described in NFPA-262 positioned in an exhaust extension of the furnace in which the burn test is conducted. The smoke measurement system includes a photoelectric cell, which detects and quantifies the smoke emitted by the cable jacket during the 10-minute period of the burn test. The software associated with the photoelectric cell reports the % obscuration in the exhaust stream from the furnace in the ten-minute period, and the area under the % obscuration/time curve is the Smoke Index (see NFPA-255, Appendix A, 3-3.4 for the determination of Smoke Index). The Flame Spread Index and Smoke Index are determined on as is lengths of cable, i.e. without slitting the jacket lengthwise and without first exposing the cable to accelerated aging. The chemical stability of FEP enables the tensile and burn results after aging at 158° C. for seven days to be about as good as the results before aging.

The FEP used as the primary insulation on the twisted pairs of wires used in the Examples has an MFR of 28 g/10 min and contains PEVE comonomer as described in U.S. Pat. No. 5,677,404. The same FEP is used in the jacket composition in the following Examples unless otherwise specified.

Comparative Example

A jacket composed only of FEP fails the NFPA-255 burn test. Tensile testing of compression molded plaques (ASTM D 638) of the FEP results in good tensile strength and elongation of 3259 psi (22.5 MPa) and 350%, respectively.

A jacket of the FEP and Kraton® G1651 thermoplastic elastomer (1 wt %) fails the NFPA-255 burn test.

A composition of FEP and 30 wt % ZnO (Kadox® 930) reduces the MFR of the FEP to 20-22 g/10 min, and compression molded plaques exhibit less than desired tensile properties: tensile strength of 1536 psi (10.6 MPa) and elongation of only 106%.

From this comparative Example, it is seen that neither the filler component as a char-forming agent nor the hydrocarbon polymer alone, with the FEP, form a composition that passes the NFPA-255 burn test and has good physical properties.

In the following Examples of the present invention, a number of compositions are described, each containing FEP, filler as char-forming agent, and hydrocarbon polymer, each forming test articles exhibiting good physical and electrical properties, and each capable of being extruded as cable jacketing at line speeds exceeding 300 ft/min at the low melt temperature specified above as a jacket over twisted pairs of insulated wires, with the resultant jacketed cable passing the NFPA-255 burn test.

Example 1

The composition 100 parts of FEP, 3.5 parts Kraton® G1651 thermoplastic elastomer, and 30 parts calcium molybdate (mean particle size less than 1 μm), to total 133.5 parts by weight, is melt blended and then extruded. Tape samples (similar to cable jacketing) tested in accordance with ASTM D 412 (5.1 cm/min) exhibit a tensile strength of 1460 psi (10.1 MPa) and elongation of 150%. Test samples also exhibit good electrical and nonflammability properties, as follows: dielectric constant of 2.64 and dissipation factor of 0.004 (ASTM D 150) and an limiting oxygen index (LOI) of greater than 100% (0.125 in sample (3.2 mm)). The lower the dielectric constant, the better; generally a dielectric constant of no greater than 4.0 is considered satisfactory. These test procedures are used in the succeeding Examples unless otherwise indicated.

Example 2

The composition 100 part FEP, 30 parts Kadox® 920 ZnO mean particle size 0.2 μm, and 3.5 parts Kraton® G1651 thermoplastic elastomer is melt blended and extruded. Tape samples exhibit the following properties: tensile strength 1730 psi (11.9 MPa and elongation 225%. Test samples also exhibit good electricals and non-flammability: dielectric constant of 2.5, dissipation factor of 0.007, and LOI of greater than 100%.

Example 3

The composition of 100 parts FEP, 3.5 parts Kraton® G1651, 30 parts ZnO (Kadox® 920), and 5 parts calcium molybdate is melt blended and extruded. Tape samples exhibit tensile strength of 1792 psi (12.3 MPa) and elongation of 212%. Dielectric constant is 2.72, dissipation factor is 0.011 and LOI is greater than 100%.

Example 4

The composition of 100 parts FEP, 1 part Kraton®, and 66.66 parts of Onguard® 2 (MgZnO$_2$) is melt blended and extruded to give good extrudate, i.e. smooth to form a tough jacket having satisfactory tensile strength and elongation.

Example 5

The composition 100 parts FEP, 5 parts Engage® polyolefin, and 20 parts Mg(OH)$_2$/Zn molybdate (Kemguard® MZM), mean particle size less than 1 μm, is melt blended and extruded, and its test samples exhibit tensile strength of 1850 psi (12.8 MPa), elongation of 153% and LOI of 91%.

Example 6

The composition 100 parts FEP, 1.5 parts Kraton® G1651 and 75 parts Cerox® 502 ZnO, mean particle size of 2.2 μm, is melt blended and extruded to give good extrudate. Tensile testing on rod samples (51 cm/min) gave tensile strength of 2240 psi (15.4 MPa) and elongation of 215%.

Example 7

The composition of 100 parts FEP, 3 parts DGDL 3364 (Dow Chemical high density polyethylene, and 75 parts Cerox® 506 ZnO is melt blended and extruded to give good extrudate. Test rods exhibit tensile strength of 1830 psi (12.6 MPa) and elongation of 110%, which is good for rod samples.

Example 8

The composition of 100 parts FEP, 2.5 parts Siltem® 1500 (dried) (siloxane/polyetherimide block copolymer), and 75 parts Cerox® 506 ZnO is melt blended and extruded to give good extrudate. Test rods exhibit tensile strength 1700 psi (11.7 MPa) and 170% elongation.

Example 9

The composition 100 parts FEP, 5 parts Lexan® 141 polycarbonate, 5 parts Kraton® G1651 thermoplastic elastomer, and 50 parts Cerox® 506 ZnO is melt blended and extruded to give good quality extrudate. Rod test samples exhibit tensile strength of 2245 psi (15.5 MPa) and 300% elongation.

Example 10

The composition of 100 parts FEP, 1 part Lexan® 141 polycarbonate, and 75 parts Cerox® 506 ZnO is melt blended and extruded to give good quality extrudate.

Example 11

The composition of 68 wt % FEP, 2 wt % Kraton® G1651 thermoplastic elastomer, and 30 wt % Al$_2$O$_3$ is melt blended and tested for MFR, which is better (higher) for the composition (32.3 g/10 min) than the FEP by itself (MFR 31.1 g/10 min). The composition gives good extrudate.

Example 12

The composition of 100 parts FEP, 30 parts Kadox® 930 ZnO and 2 parts polyethylene (Alathon® 20, MFR 1.9 g/10 min at 190° C.) is melt blended and extruded to give good extrudate. Test rods exhibit a tensile strength of 2026 psi (14 MPa).

Example 13

A jacket having the following composition: FEP 100 parts, aromatic hydrocarbon elastomer (Kraton® G1651) 1 part per hundred parts (pph) FEP, and 66.66 pph Kadox® 930 ZnO (mean particle size of 0.33 μm (total weight of composition is 176.66 parts), is formed. The jacket has a wall thickness of 9-10 mil (0.23-0.25 mm) and the overall cable has a diameter of 0.166 in (4.2 mm) and forms a snug fit (exhibiting a cylindrical appearance, not conforming to the surface topography of the core of twisted pairs of insulated wires) over the 4 twisted pairs of insulated wire in the cable. 121 lengths of this cable are simultaneously subjected to the burn test according to NFPA-255, with the result being a Flame Spread Index of 0 and a Smoke Index of 29. The surface of the jacket is smooth and the tensile strength and elongation of rod samples of the composition are 2235 psi (15.4 MPa) and 165%, respectively. The tensile properties of the jacket itself are tested in accordance with ASTM D 3032, wherein a length of jacket is cut circumferentially and is slipped off the cable to form the test specimen. The test conditions are a spacing of 2 in (5.1 cm) between the tensile tester jaws, and the jaws being pulled apart at the rate of 20 in/min (51 cm/min). The jacket specimen so-tested exhibits a tensile strength of 2143 psi (14.8 MPa) and elongation of 301%. The jacket also exhibits a dielectric constant at 100 MHz of 3.32. When the burn test is repeated on this cable after aging at 158° C. for 7 days, it exhibits a Flame Spread Index of 0 and Smoke Index of 25.

Example 14

The NFPA-255 burn test is carried out on a cable wherein the jacket has the following composition: 100 parts FEP, 3.5 pph Kraton® G1651, and 100 pph Cerox®-506 ZnO (mean particle size less than 1 μm), to total 203.5 parts. The jacket wall thickness varies from 7-13 mils (0.18-0.33 mm) and the cable thickness is 0.186 in (4.7 mm). 108 cable lengths are tested in the burn test, and the result is Flame Spread Index of 0 and Smoke Index of 23.

Example 15

Results similar to Example 13 are obtained when the jacket composition is 100 part FEP, 2.6 pph Kraton® G1651, and 75 pph Ceroxe 506 ZnO, to total 177.6 parts, and the jacket wall thickness is 10 mil (0.25 mm) and the cable diameter is 0.186 in (4.7 mm). 108 lengths of the cable are tested in the NFPA-255 burn test, and the results are Flame Spread Index of 0 and Smoke Index of 30.

Example 16

Results similar to Example 13 are obtained when the jacket composition is as follows: 100 parts FEP, 3.5 pph Kraton® G1651, and 50 pph Cerox® 506 ZnO, to total 153.5 parts, and the jacket wall thickness is 8 mils (0.2 mm) and the cable diameter is 0.156 in (4 mm). 129 lengths of cable are tested in the NFPA-255 burn test, and the results are Flame Spread Index of 0 and Smoke Index of 25. The jacket also exhibits a dielectric constant of 3.6 at 100 MHz.

Example 17

Similar results as Example 13 are obtained when the jacket composition is: 100 parts FEP, 3.5 pph Kraton® G1651, and 30 pph Kadox® 920 ZnO, to total 133.5 parts, and the jacket wall thickness is 7 mils (0.18 mm) and the cable diameter is 0.169 in (4.3 mm). 119 lengths of cable are tested in the NFPA-255 burn test and the results are Flame Spread Index of 1 and Smoke Index of 40.

Example 18

In this Example, the composition of Example 13 is varied by replacing some of the Kadox® 930 ZnO by Zeeospheres® ceramic microspheres W-210 having a mean particle size of 3 μm, and the composition is extruded as a smooth jacket to form coaxial cable comprising a central copper conductor, a foamed plastic insulation, a metal braid surrounding the foamed insulation, and the jacket.

In one extrusion run, the jacket composition has only 46.7 parts of Kadox® per hundred parts of FEP and has 20.0 parts per hundred of the ceramic microspheres (11.93 wt % of the composition). In another extrusion run, the same proportion of ceramic microspheres is present, but the Kraton® is replaced by the same amount of Siltem® 1500. In another extrusion run, the ceramic microsphere content is decreased to 10 parts per hundred parts of FEP and the same hydrocarbon polymer (Siltem® 1500) is used, the proportion of ceramic microspheres in this composition being 5.96 wt %. All of these jacket compositions provide an advantage over the Example 13 composition in exhibiting no spark faults in wire line testing applying a voltage of 3000V to the jacket at a line speed of about 53 m/min for at least 2 min. The jacket for coaxial cable is prone to spark faults because of the underlying metal braid. Use of the ceramic microspheres to constitute at least part of the char-forming agent in the jacket eliminates spark faults. In still another extrusion run, the jacket composition contains less Kadox® than Example 13, i.e. 50 parts per hundred parts of FEP, 1.0 part of Siltem® 1500 instead of the 1 part of Kraton®, and additionally 2.5 parts of Aerosil® R-972 fumed silica per 100 parts of FEP. This jacket too exhibits no spark faults.

All of these jacket compositions are also applied as a jacket over four twisted pairs of insulated wire for comparison of the burn/smoke generation performance (NFPA-255) with the jacket of Example 13, and these jacket compositions performs as well as the Example 13 jacket in this regard.

What is claimed is:

1. A process comprising extruding a composition comprising tetrafluoroethylene/hexafluoropropylene copolymer, about 10-60 wt % inorganic particulate filler, and an effective amount of hydrocarbon polymer to disperse said particulate filler in said copolymer either during melt blending prior to said extruding of said composition or during said extruding, the amount of said copolymer, filler and polymer totaling 100 wt %, wherein said extruding is carried out at a melt temperature ranging from about 520° F. (271° C.) to 650° F. (343° C.), said effective amount of hydrocarbon polymer being about 0.5 to 3 wt %, wherein said copolymer and said hydrocarbon polymer are incompatible to one another and said hydrocarbon polymer is an aromatic-containing thermoplastic elastomer.

2. The process of claim 1 wherein 20 to 50 wt % of said inorganic particulate filler is present.

3. The process of claim 1 wherein the dispersion of said particulate filler in said copolymer is characterized by said composition having an elongation of at least about 150% in accordance with ASTM D 3032.

4. The process of claim 1 wherein said extruding is carried out at a melt temperature of said composition of about 560° F. (293° C.) to 620° F. (326° C.).

5. The process of claim 1 wherein said particulate filler has an average particle size of less than about 3 micrometers.

6. The process of claim 1 wherein said extruding is to form cable jacket and said extruding is carried out at a speed of at least about 300 ft/min (91.5 m/min).

7. The process of claim 6 wherein said extruding is carried out at a draw down ratio of no greater than about 40:1.

8. The process of claim 1 wherein said filler comprises a plurality of fillers.

9. The process of claim 8, wherein at least one of said fillers is ceramic microspheres.

10. The process of claim 1 wherein said copolymer has a melt flow rate of at least about 10 g/10 min.

11. A process comprising extruding a composition comprising tetrafluoroethylene/hexafluoropropylene copolymer, 20 to 50 wt % inorganic particulate filler, about 0.1 to 5 wt % of hydrocarbon polymer to disperse said particulate filler in said copolymer either during melt blending prior to said extruding of said composition or during said extruding, the amount of said copolymer, filler and polymer totaling 100 wt %, wherein said extruding is carried out at a melt temperature ranging from about 560° F. (293° C.) to 620° F. (326° C.) to form cable jacket, wherein said copolymer and said hydrocarbon polymer are incompatible to one another and said hydrocarbon polymer is an aromatic-containing thermoplastic elastomer.

* * * * *